United States Patent Office 3,209,003
Patented Sept. 28, 1965

3,209,003
2-AMINO-4-ARYLAMINO-6-(H—)-1,3,5-TRIAZINES
Royal A. Cutler, Sand Lake, and Samuel Schalit, Albany, N.Y., assignors to Sterling Drug Inc., New York, N.Y., a corporation of Delaware
No Drawing. Filed June 26, 1963, Ser. No. 290,622
14 Claims. (Cl. 260—249.9)

The instant application is a continuation-in-part of our copending application Serial No. 14,551, filed March 14, 1960, now abandoned.

This invention relates to disubstituted 1,3,5-triazines. More particularly, this invention relates to 2-amino-4-arylamino-1,3,5-triazines and to the preparation of the same.

The novel 2-($H_2N$—)-4-arylamino-6-(H—)-1,3,5-triazines of this invention produce diuresis and chloruresis, and they are useful as diuretic agents. Moreover, some of these compounds have useful antibacterial, antifungal, and antiviral activity, and many members are antiinflammatory agents.

The new compounds of the instant invention are 2-($H_2N$—)-4-arylamino-6-(H—)-1,3,5 - triazines having the structural formula

FORMULA I

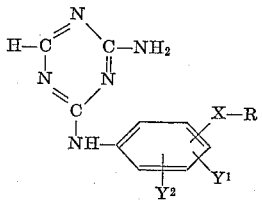

wherein: $Y^1$ is a member of the group consisting of hydrogen, halogen, and R—X—; $Y^2$ is a member of the group consisting of hydrogen and halogen; R is lower alkyl; and X is a member of the group consisting of —S—, —SO—, and —$SO_2$—.

The term "lower alkyl" in Formula I designates the monovalent lower molecular weight saturated aliphatic hydrocarbon radicals, the preferred radicals being those having 1–6 carbon atoms, for example methyl, ethyl, n-propyl, isopropyl, n-butyl, isobutyl, n-hexyl, isohexyl, and the like.

When either or both of $Y^1$ and $Y^2$ in Formula I is halogen, there are included fluorine, chlorine, bromine, and iodine.

In free base form, our new compounds are basic substances which interact with organic and inorganic acids to form the corresponding acid-addition salts. These acid-addition salts and the free bases of course have the common respective structural entities represented by structural Formula I. The acid-addition salts are the full equivalents of the free base forms, and the new compounds of the invention thus reside in the concept of the bases and cationic forms and not in any particular acid moiety or acid anion associated with the salt forms of our compounds; rather, the acid moieties or anions which can be associated in the salt forms are in themselves neither novel nor critical and therefore can be any acid anion or acid-like substance capable of salt formation with bases. It will be appreciated that in aqueous solutions the base form and the water-soluble acid-addition salt form of the compounds of the invention possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids such as found, for example, in Beilstein's Organische Chemie, 4th ed., volumes III, IV, IX, X, XIV, XVII, XIX, XXI, XXII, and XXV; oragnic mono- and polysulfonic and -sulfinic acids such as found, for example in Beilstein volumes VI, XI, XVI, and XXII; organic phosphonic and phosphinic acids such as found, for example, in Beilstein volumes XI and XVI; organic acids of arsenic and antimony such as found, for example, in Beilstein volume XVI; organic heterocyclic carboxylic, sulfonic, and sulfinic acids such as found, for example in Beilstein volumes XVIII, XXII, and XXV; acidic ion-exchange resins; and inorganic acids of any acid forming element or combination of elements such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluonic acid, saccharic acid, ascorbic acid, penicillin, benzoic acid, phthalic acid, salicylic acid, 3,5-dinitrobenzoic acid, anthranilic acid, cholic acid, 2-pyridinecarboxylic acid, 3-hydroxy-2-naphthoic acid, pamoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like.

The acid-addition salts are prepared in conventional fashion, for instance either by direct mixing of the acid and the base or, when this is not appropriate, by dissolving either or both of the acid and the base separately in water or an organic solvent and mixing the two solutions, or by dissolving both the acid and the base together in a solvent. The resulting acid-addition salt is isolated by filtration, if it is insoluble in the reaction medium, or by evaporation of the reaction medium to leave the acid-addition salt as a residue.

The mono- and di-acid-addition salts of the free base forms of the compounds of Formula I are useful not only as chemotherapeutic agents, but are also useful as characterizing or identifying derivatives of the free bases and in isolation or purification procedures. Moreover, the acid-addition salts react with strong bases, such as alkali metal hydroxides, to generate the free bases, and accordingly all of the salts, regardless of considerations of solubility, toxicity, physical form, or the like of a particular species of acid-addition salt, are useful for the purposes of our invention since they are sources of the free bases.

It will be appreciated from the above that if one or more of the characteristics, such as solubility, molecular weight, physical appearance, toxicity, or the like of a given acid-addition salt render it unsuitable for the particular desired purpose, as for example, use as a diuretic agent or as an inflammatory agent, or in an isolation or purification procedure, or the like, the acid-addition salt can be converted to the free base and then to another, more suitable acid-addition salt, for instance a pharmaceutically-acceptable salt when a pharmaceutical use is involved.

The free bases and many of the acid-addition salts have a low water-solubility. Generally speaking, the acid-addition salts with citric acid and with methanesulfonic acid are considerably more soluble in water than are the hydrochlorides.

The compounds of our invention are conveniently obtained by heating formic acid with the free base form of a 1-arylbiguanide having the formula

FORMULA II

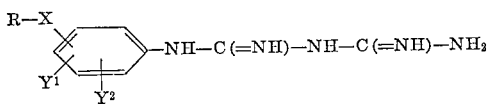

wherein $Y^1$, $Y^2$, R, and X have the same significance indicated hereinabove. This reaction is readily carried out, for example, by heating a mixture of the reactants, conveniently at reflux temperature, until the reaction is complete, ordinarily about one to three hours being sufficient for this purpose. The desired reaction product, which is substantially insoluble in water, is readily isolated and, if desired, purified by conventional manipulative techniques.

Ordinarily, instead of employing one molecular equivalent of each of the two reactants, we prefer to use an excess of the formic acid so that this compound can serve also as a convenient reaction medium.

When it was desired to use the hydrochloride instead of the free base form of the 1-arylbiguanide in the above procedure for preparing our compounds, we added to the formic acid reactant an amount of sodium formate in slight molar excess over the amount of the 1-arylbiguanide hydrochloride.

The 1-arylbiguanides employed as starting materials in the above process are conveniently obtained by heating together approximately equimolecular amounts of the appropriate arylamine hydrochloride

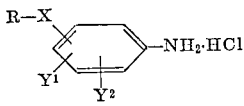

wherein $Y^1$, $Y^2$, R, and X have the same significance indicated hereinabove, and dicyanodiamide in water, and converting the resulting hydrochloride form of the 1-arylbiguanide to the free base by treatment with alkali. Instead of using the preformed arylamine hydrochloride, the arylamine itself and an equivalent amount of hydrogen chloride (as hydrochloric acid) can be employed. The following general procedure was used:

To 300 ml. of water, heated to reflux temperature in a one-liter 3-neck flask fitted with a stirrer and reflux condenser, there was added 0.5 mole of the desired arylamine hydrochloride; or, alternatively, there were used 0.5 mole of the free arylamine and 0.5 mole of hydrogen chloride (as hydrochloric acid). To the solution thus obtained there was gradually added 42 g. (0.5 mole) of dicyanodiamide. The resulting reaction mixture was refluxed for about one hour and was then chilled. The solid which separated from solution was collected on a filter, washed with water, and dried. This product was the 1-arylbiguanide hydrochloride. These hydrochlorides obtained in this manner were of sufficient purity for use as chemical intermediates but, when desired, they were recrystallized from a suitable solvent, such as isopropyl alcohol, to obtain the pure salt. When it was desired to convert the hydrochlorides to the corresponding free bases this was generally carried out as follows: The hydrochloride was dissolved in the minimum quantity of boiling water and an excess (1 to 2.5 moles) of sodium hydroxide (as a 35 percent aqueous sodium hydroxide solution) was added to the hot solution. The alkaline solution was chilled and the solid which separated from solution was collected on a filter, washed with water, and dried. The free base thus obtained was ordinarily employed as a starting material without any further purification. However, when desired, the free base was purified by conventional recrystallization means.

The following are illustrative of the 1-arylbiguanides which were prepared by the foregoing procedure:

1-(4-methylmercaptophenyl)biguanide hydrochloride, M.P. 221–223° C.

1-(4-ethylmercaptophenyl)biguanide hydrochloride, M.P. 204–206° C.

1-(4-n-propylmercaptophenyl)biguanide hydrochloride, M.P. 196–197° C.

1-(4-isopropylmercaptophenyl)biguanide, 169–171° C.; the hydrochloride, M.P. 204–205° C.

1-(4-n-butylmercaptophenyl)biguanide hydrochloride, M.P. 192–195° C.

1-(4-n-amylmercaptophenyl)biguanide, 129–131° C.; the hydrochloride, M.P. 187–191° C.

1-(4-methylmercapto-3-chlorophenyl)biguanide hydrochloride, M.P. 190–192° C.

1-(4-ethylmercapto-3-chlorophenyl)biguanide hydrochloride, M.P. 191–192° C.

1-(4-n-propylmercapto-3-chlorophenyl)biguanide hydrochloride, M.P. 179–180° C.

1-(4-isopropylmercapto-3-chlorophenyl)biguanide hydrochloride, M.P. 196–197° C.

1-(4-n-butylmercapto-3-chlorophenyl)biguanide hydrochloride, M.P. 183–185° C.

1-(4-n-amylmercapto-3-chlorophenyl)biguanide hydrochloride, M.P. 192°–193° C.

1-(4-n-hexylmercapto-3-chlorophenyl)biguanide hydrochloride, M.P. 116–118° C.

1-(4-n-heptylmercapto-3-chlorophenyl)biguanide hydrochloride, M.P. 120–124° C.

1-(4-methylsulfonylphenyl)biguanide hydrochloride, M.P. 226–228° C.

1-[3,4-bis(methylmercapto)phenyl]biguanide hydrochloride, M.P. 202–206° C. (uncorr.).

1-(4-n-hexylsulfonylphenyl)biguanide, M.P. 215–219° C. (uncorr.).

1-[3,4-bis(ethylmercapto)phenyl]biguanide hydrochloride, M.P. 213–214° C. (uncorr.).

1-(4-ethylsulfonylphenyl)biguanide, M.P. 173–175° C. (uncorr.).

1-[3,4-bis(n-propylmercapto)phenyl]biguanide hydrochloride, M.P. 208–209° C. (uncorr.).

1-(4-n-propylsulfonylphenyl)biguanide, M.P. 174–176° C. (uncorr.).

1-(4-n-hexylmercaptophenyl)biguanide, M.P. 126–130° C. (uncorr.).

1-(3-methylmercaptophenyl)biguanide hydrochloride, M.P. 200–201° C.

1-(3-n-propylmercaptophenyl)biguanide, M.P. 205–206° C.

1-(3,5-dichloro-4-methylmercaptophenyl)biguanide hydrochloride, M.P. 244–249° C. (uncorr.).

1-(3,5-dichloro-4-ethylmercaptophenyl)biguanide hydrochloride, M.P. 252–256° C. (uncorr.).

1-(3,5-dichloro-4-n-propylmercaptophenyl)biguanide hydrochloride, M.P. 245–249° C. (uncorr.).

1-(4-n-amylsulfonylphenyl)biguanide, M.P. 170–171° C. (uncorr.).

1-(4-n-butylsulfonylphenyl)biguanide, M.P. 157–161° C. (uncorr.).

Certain of these 1-arylbiguanides are disclosed and claimed in our copending application Serial No. 69,789, filed October 24, 1960, now U.S. Patent No. 3,136,816, which is a division of our copending application Serial No. 14,551, filed March 14, 1960, now abandoned.

The species of our new compounds of Formula I which are sulfoxides (i.e., wherein X is —SO—) can be prepared by the general method described above and also by oxidation of the corresponding sulfides, for instance by oxidation with one equivalent of hydrogen peroxide. The species of Formula I which are sulfones (i.e., where X is —$SO_2$—) can be prepared by the general methods above and also by oxidation of the corresponding sulfides with two equivalents, or of the corresponding sulfoxides with one equivalent, of an organic per-acid such as peracetic acid or perbenzoic acid.

The chemical structures of the compounds of this invention followed from the modes of preparation and from elementary analyses of the products.

Our invention is illustrated by the following examples without, however, being limited thereto.

*Example 1*

(A) A mixture of 68 g. of 1-(4-methylmercaptophenyl)biguanide and 600 ml. of 90 percent formic acid was refluxed for three hours. The olive-green reaction mixture was filtered to remove a small amount of solid, and the filtrate was evaporated under reduced pressure to a volume of about 300 ml. This concentrated solution, which had a brown color, was poured into 1050 ml. of cold water. The mixture, which contained light pink solid which had separated from solution, was stirred and cooled for thirty minutes and then filtered. The solid thus collected was washed and dried. The product thereby obtained, which weighed 59.5 g., was dissolved in 250 ml. of boiling dioxane, decolorizing charcoal was added, and the mixture was filtered while hot. The red filtrate was stirred and chilled, 100 ml. of dioxane was added, and after again chilling the mixture it was filtered to collect the solid which had separated from solution. The collected solid was sucked partially dry on the filter and was then removed and stirred with 75 ml. of cold dioxane. The mixture was filtered, and the collected solid was washed with diethyl ether and dried. The solid thus obtained weighed 39 g. and melted at 207–210° C. A 37 g. portion of this product was dissolved in 225 ml. of boiling dioxane, decolorizing charcoal was added and the mixture was filtered while hot. The filtrate was allowed to cool slowly to room temperature (about 25° C.). The precipitate which had separated from solution was collected on a filter, washed with cold dioxane and with diethyl ether, then stirred with petroleum ether, and re-collected on a filter. There was thus obtained 21.5 g. of white solid which melted at 210–211° C. This product was 2-amino-4-(4-methylmercaptophenylamino)-1,3,5-triazine, having the molecular formula $C_{10}H_{11}N_5S$.

The solubility of this base in each of water, hydrochloric acid, and 95 percent ethyl alcohol at 25° C. was less than 0.25 percent. In 25 percent aqueous citric acid solution at 25° C., the base was soluble up to 4 percent; and in 10 percent aqueous citric acid solution, its solubility was less than 1 percent.

In dogs, this compound had a diuretic activity greater than that of theophylline in comparisons at dosage levels of 7.5, 15, 30, and 60 mg./kg. In mice, the oral $LD_{50}$ of 2-amino-4-(4-methylmercaptophenylamino)-1,3,5 - triazine in mice was 1360 ±290 mg./kg. (twenty-four hour test) and 540 ±137 mg./kg. (seven day test); and the intragastric approximate $LD_{50}$ was 310 mg./kg.

At dilutions as high as about 1 to 100,000–120,000, 2-amino-4-(4-methylmercaptophenylamino)-1,3,5 - triazine had bacteriostatic and bactericidal activity in vitro against *Staphylococcus aureus*, 209; *Streptococcus hemolyticus*, C203; *Eberthella typhi*, Hopkins; *Clostridium welchii*, M; and *Mycobacterium tuberculosis*, H37Rv. It had fungistatic and fungicidal activity against *Trichophyton interdigitale*, *Trichophyton mentagrophytes*, and *Trichophyton gypseum*.

(B) Following the above procedure but employing 83.5 g. of 1-(4-methylsulfinyl-3-chlorophenyl)biguanide as the biguanide reactant, the product obtained is 2-amino-4-(4-methylsulfinyl-3-chlorophenylamino) - 1,3,5-triazine, having the molecular formula $C_{10}H_{10}ClN_5OS$.

*Example 2*

(A) Using a procedure similar to that described in part A of Example 1, 92 g. of 1-(4-ethylmercaptophenyl)-biguanide and 795 ml. of 90 percent formic acid were interacted to yield as a product 55.3 g. of a tan powder which melted at 170–173° C. This solid was recrystallized from 920 ml. of anhydrous ethyl alcohol, with charcoaling to obtain 36 g. of solid which melted at 175–177° C. This product was 2-amino-4-(4-ethylmercaptophenylamino) - 1,3,5 - triazine, having the molecular formula $C_{11}H_{13}N_5S$. The solubility of this base in each of water and 1 N hydrochloric acid at 25° C. was less than 0.25 percent; its solubility in 95 percent ethyl alcohol was less than 1 percent.

(B) Following the above procedure but employing 129 g. of 1-(4-ethylsulfinyl-2-chlorophenyl)biguanide as the biguanide reactant, the product obtained is 2-amino-4-(4-ethylsulfinyl-2-chlorophenylamino) - 1,3,5-triazine, having the molecular formular $C_{11}H_{12}ClN_5OS$.

In diuretic tests in dogs: the diuresis caused by 2-amino-4 - (4-ethylmercaptophenylamino) - 1,3,5-triazine was greater than that caused by theophylline at comparative doses of 7.5, 15, 30 mg./kg., and less than that caused by theophylline at comparative doses of 60 mg./kg.; and the chloruresis caused by 2-amino-4-(4-ethylmercaptophenylamino) - 1,3,5-triazine was greater than that caused by theophylline at comparative doses of 7.5 and 15 mg./kg., and less than that caused by theophylline at comparative doses of 30 and 60 mg./kg.

In mice, the peroral $LD_{50}$ of 2-amino-4-(4-ethylmercaptophenylamino)-1,3,5-triazine was greater than 2000 mg./kg. (twenty-four hour test), 2000 ±970 mg./kg. (seven day test), and 1680 ±740 mg./kg. (fourteen day test). Oral administration of 2-amino-4-(4-ethylmercaptophenylamino)-1,3,5-triazine to dogs in doses of 30 mg./kg./day for eighteen days did not produce any kidney damage in the dogs.

*Example 3*

Using a procedure similar to that described in Example 1, 50 g. of 1-(4-n-propylmercaptophenyl)biguanide and 430 ml. of 90 percent formic acid were interacted to yield 37.4 g. of solid product which melted at 153–158° C. This solid was recrystallized from 370 ml. of isopropyl alcohol, with charcoaling, and the product was washed with 50 ml. of diethyl ether. There was thus obtained 10.5 g. of off-white powder which melted at 157–158° C. This product was 2-amino-4-(4-n-propylmercaptophenylamino)-1,3,5-triazine, having the molecular formula $C_{12}H_{15}N_5S$. This base was soluble in a mixture of 0.76 ml. 0.5 N hydrochloric acid and 0.24 ml. of water at 25° C. to the extent of about 5 percent; on standing, a solid precipitated from the 5 percent solution. The solubility of the base in ethyl alcohol at 25° C. was less than 1 percent.

In rats, excretion of urine was more than doubled in a six-hour observation period when doses as low as 1 mg./kg. were used; renal excretion of sodium and chloride ions was considerably increased, but no significant increase in potassium excretion occurred. The effect on sodium and chloride ion excretion produced in rats by a total dose of 0.936 mg./kg. subcutaneously was substantially the same as that produced by a total dose of 20 mg./kg. of 2-amino-4-(4-chlorophenylamino)-1,3,5-triazine; that is, the former compound was about twenty times as potent a diuretic agent as the latter compound.

At a diuretically effective dose level (20 mg./kg.), 2-amino-4-(4-chlorophenylamino)-1,3,5-triazine significantly elevated the blood urea nitrogen level in rats whereas at an approximately equipotent diuretic dose level (0.036 mg./kg.), 2-amino-4-(4-n-propylmercaptophenylamino)-1,3,5-triazine had no effect on the blood urea nitrogen level in rats.

2-amino-4-(4-n-propylmercaptophenylamino)-1,3,5-triazine was also found to be diuretically active in dogs at doses up to 60 mg./kg. orally, the activity being less in this species than in the rat.

In mice, the oral $LD_{50}$ of 2-amino-4-(4-n-propylmercaptophenylamino)-1,3,5-triazine was >4000 mg./kg. (twenty-four hour test), 3835 mg./kg. (seven day test), and 3340 mg./kg. (fourteen day test).

*Example 4*

Using a procedure similar to that described in Example 1, 94 g. of 1-(4-n-butylmercaptophenyl)biguanide was interacted with 215 ml. of 90 percent formic acid to yield 71 g. of solid product which melted at 155–164° C. This solid was recrystallized from 1380 ml. of isopropyl alcohol, with charcoaling, to obtain 54 g. of solid which was then recrystallized from 1100 ml. of isopropyl alcohol, with charcoaling. There was thus obtained 42 g. of white powder which melted at 161–162° C. This product was 2-amino-4-(4-n-butylmercaptophenylamino)-1,3,5-triazine, having the molecular formula $C_{13}H_{17}N_5S$. The solubility of this base in water at 25°C. was less than 0.25 percent, and its solubility in ethyl alcohol at 25° C. was less than 1 percent.

This compound showed diuretic activity when administered subcutaneously to rats at total dosage levels of 10 mg./kg. and 20 mg./kg.

This compound had bacteriostatic activity in vitro against *Staphylococcus aureus*, 209 and against *Eberthella typhi*, Hopkins at dilutions as high as 1 to 10,000.

In mice, the oral approximate $LD_{50}$ of 2-amino-4-(4-n-butylmercaptophenylamino)-1,3,5-triazine was greater than 4000 mg./kg. (twenty-four hour test and seven day test), and was 3000 mg./kg. (fourteen day test).

*Example 5*

A mixture of 42.0 g. of 1-(4-methylsulfonylphenyl)-biguanide and 465 ml. of 90 percent formic acid was refluxed for three hours. The resulting turbid, colorless reaction mixture was filtered and the filtrate was concentrated by evaporation to a volume of 230 ml. The concentrated solution was added to 465 ml. of cold water, and the mixture was chilled to 0° C. with occasional stirring. The white solid which separated from solution was collected on a filter, washed well with cold water, and sucked partially dry on the filter. To remove traces of formic acid, the product was mixed with 500 ml. of 5 percent aqueous sodium bicarbonate solution, and the mixture was filtered. The collected solid was washed well with water and dried in an oven at 70° C. to yield 19.0 g. of solid which melted at 243–246° C. This product was 2-amino-4-(4-methylsulfonylphenylamino)-1,3,5-triazine, having the molecular formula $C_{10}H_{11}N_5O_2S$. In each of water and hydrochloric acid at 25° C. the solubility of this base was less than 0.25 percent; in each of 10 percent aqueous citric acid solution and 5 percent aqueous methanesulfonic acid solution, it was soluble to the extent of about 1 percent; and in 95 percent ethyl alcohol, its solubility was less than 1 percent.

In dogs, the diuretic activity of 2-amino-4-(4-methylsulfonylphenylamino)-1,3,5-triazine was greater than that of theophylline at comparative doses of 7.5, 15, 30, and 60 mg./kg.

In mice, the oral approximate $LD_{50}$ of 2-amino-4-(4-methylsulfonylphenylamino)-1,3,5-triazine was 350 mg./kg. (twenty-four hour test) and 309 mg./kg. (seven day test).

(B) Following the above procedure, but employing 47.5 g. of 1-(4-methylsulfonyl-3-chlorophenyl)biguanide as the biguanide reactant, the product obtained is 2-amino-4-(4-methylsulfonyl-3-chlorophenylamino)-1,3,5-triazine, having the molecular formula $C_{10}H_{10}ClN_5O_2S$.

(C) Following the above procedure, but employing 57.5 g. of 1-(3-ethylsulfonyl-4-bromophenyl)biguanide as the biguanide reactant, the product obtained is 2-amino-4-(3-ethylsulfonyl-4-bromophenylamino)-1,3,5-triazine, having the molecular formula $C_{11}H_{12}BrN_5O_2S$.

*Example 6*

Using a procedure similar to that described in part A of Example 1, but substituting 73 g. of 1-(4-methylsulfinylphenyl)biguanide for the 1-(4-methylmercaptophenyl)biguanide, there is obtained as the reaction product 2-amino-4-(4-methylsulfinylphenylamino)-1,3,5-triazine, having the molecular formula $C_{10}H_{11}N_5SO$.

*Example 7*

A mixture of 30 g. of 2-amino-4-(4-n-butylmercaptophenylamino)-1,3,5-triazine, 90 ml. of water, and 270 ml. of acetic acid was warmed to approximately 45° C. to dissolve the solid. The resulting solution was cooled to 23° C. and 11.4 ml. of 30 percent hydrogen peroxide was gradually added over a period of about five minutes. During this addition the temperature of the reaction mixture rose slowly to a maximum of 32° C. The reaction mixture was heated for five and one-half hours at 40–45° C., then allowed to stand overnight at room temperature, and heated at 40–45° C. for four hours. Titration of a small aliquot of the reaction mixture with 0.1 N aqueous ceric sulfate solution showed less than 1 percent of hydrogen peroxide remained. To eliminate the excess hydrogen peroxide, a pinch (0.1–0.2 g.) of 10 percent palladium on charcoal catayslt was added to the reaction mixture, which was then allowed to stand overnight. The reaction mixture was filtered, and the light brown filtrate thus obtained was distilled under reduced pressure to yield 50 g. of a brown syrup. This syrup was dissolved in 100 ml. of dioxane, and the resulting solution was treated with decolorizing charcoal and filtered, these operations being carried out rapidly because separation of a solid from the dioxane solution started quickly. The filtrate was allowed to stand for two days at room temperature and then the white solid which had separated from solution was collected on a filter and washed with dioxane. When the solid was fairly dry, it was triturated twice with portions of diethyl ether and was then collected on a filter and dried. There was thus obtained 20 g. of white powder which melted at 164–167° C. This product was 2-amino-4-(-n-butylsulfinylphenylamino)-1,3,5-triazine hemihydrate, having the molecular formula $C_{13}H_{17}NO_5S \cdot \frac{1}{2}H_2O$. This base was soluble in a mixture of 0.34 ml. of N/2 hydrochloric acid and 0.66 ml. of water to the extent of about 5 percent; the pH of the 1 percent solution was 1.8, and when this solution was adjusted to pH 3.8 with N/10 sodium hydroxide solution a precipitate formed.

*Example 8*

(A) 67.1 g. of 2-methylmercapto-4-nitrochlorobenzene was refluxed for three hours with a mixture of 116 g. of 59 percent sodium sulfide and 632 ml. of water, thereby producing 3-methylmercapto-4-(sodiomercapto)aniline. Methylation of the latter with 31.2 ml. of dimethyl sulfate yielded 3,4-bis(methylmercapto)aniline, which was treated in ethereal solution with dry hydrogen chloride to yield 43.3 g. of 3,4-bis(methylmercapto)aniline hydrochloride, which melted at 220–224° C. (uncorr.). A mixture of 37.6 g. of this hydrochloride, 14.2 g. of dicyanodiamide, and 372 ml. of dioxane was refluxed for three hours and from the resulting reaction mixture there was obtained 44.8 g. of 1-[3,4-bis(methylmercapto)phenyl]biguanide hydrochloride which melted at 202–206° C. (uncorr.).

(B) A mixture of 168 ml. of 90 percent formic acid, 41.8 g. of 1-[3,4-bis(methylmercapto)phenyl]biguanide hydrochloride, and 10.6 g. of sodium formate was refluxed for three hours, and the resulting reaction mixture was then treated with decolorizing charcoal and filtered. The filtrate thus obtained was added in a thin stream to 840 ml. of cold water, and the mixture was stirred for one hour and allowed to stand at room temperature for two days. The tan solid which had separated from solution was collected on a filter, and was washed with warm water. The damp solid was added portionwise to 400 ml. of aqueous sodium bicarbonate solution with stirring. The mixture was stirred for about two hours and was then filtered. The product thus collected was washed with water and dried to yield 24.5 g. of tan solid which melted at 184–186° C. (uncorr.). This solid was recrystallized from 1500 ml. of methanol with charcoaling. There was thus obtained 16 g. of yellow solid which was recrystallized from 1600 ml. of methanol with charcoaling to yield 12.2 g. of yellow powder which melted at 180–181° C. This product was 2-amino-4-[3,4-bis(methylmercapto)phenylamino]-1,3,5-triazine, having the molecular formula $C_{11}H_{13}N_5S_2$. The water-solubility of this base was less than 0.25 percent; and its solubility in 95 percent ethyl alcohol was less than 1 percent.

*Example 9*

(A) By refluxing a mixture of 80.5 g. of 3-chloro-4-n-propylmercaptoaniline hydrochloride (obtained by interacting 3-chloro-4-(sodiomercapto)aniline with n-propyl bromide and treating the base thus obtained with hydrogen chloride), 28.4 g. of dicyanodiamide, and 206 ml. of water, there was obtained 74.6 g. of slightly impure 1-(3-chloro-4-n-propylmercaptophenyl)biguanide hydrochloride, M.P. 168–173° C. (uncorr.) which was converted by treatment with alkali to 61.5 g. of the corresponding base, M.P. 114–128° C. (uncorr.).

(B) A mixture of 61.5 g. of 1-(3-chloro-4-n-propylmercaptophenyl)biguanide and 530 ml. of 90 percent formic acid was refluxed for three hours to yield 15.2 g. of 2-amino-4-(3-chloro-4-n-propylmercaptophenylamino)-1,3,5-triazine, having the molecular formula $C_{12}H_{14}ClN_5S$, as a white powder which melted at 165–167° C.

The solubility of this base in water was less than 0.25 percent and in 95 percent ethyl alcohol was less than 1 percent.

(C) Following the above procedure, but employing 55 g. of 1-(4-methylmercapto-3-chlorophenyl)biguanide as the biguanide reactant, the product obtained is 2-amino-4-(4-methylmercapto-3-chlorophenylamino)-1,3,5-triazine, having the molecular formula $C_{10}H_{10}ClN_5S$.

(D) Following the above procedure, but employing 74.5 g. of 1-(2-methylmercapto-4-iodophenyl)biguanide as the biguanide reactant, the product obtained is 2-amino-4-(2-methylmercapto-4-iodophenylamino)-1,3,5-triazine, having the molecular formula $C_{10}H_{10}IN_5S$.

(F) Following the above procedure, but employing 58 g. of 1-(4-ethylmercapto-2-chlorophenyl)biguanide as the biguanide reactant, the product obtained is 2-amino-4-(4-ethylmercapto-2-chlorodiphenylamino)-1,3,5-triazine, having the molecular formula $C_{11}H_{12}ClN_5S$.

(F) Following the above procedure, but employing 54.5 g. of 1-(5-ethylmercapto-3-fluorophenyl)biguanide as the biguanide reactant, the product obtained is 2-amino-4-(5-ethylmercapto-3-fluorophenylamino)-1,3,5-triazine, having the molecular formula $C_{11}H_{12}FN_5S$.

(G) Following the above procedure, but employing 71 g. of 1-(2-n-propylmercapto-4-bromophenyl)biguanide as the biguanide reactant, the produce obtained is 2-amino-4-(2-n-propylmercapto-4-bromophenylamino)-1,3,5-triazine, having the molecular formula $C_{12}H_{14}BrN_5S$ (H) Following the above procedure, but employing 64 g. of 1-(4-n-butylmercapto-3-chlorophenyl)biguanide as the biguanide reactant, the product obtained is 2-amino-4-(4-n-butylmercapto-3-chlorophenylamino)-1,3,5-triazine, having the molecular formula $C_{13}H_{16}ClN_5S$

*Example 10*

(A) By treatment of 80 g. of 4-n-hexylsulfonylaniline in ether-methanol solution with hydrogen chloride, there was obtained 86 g. of 4-n-hexylsulfonylaniline hydrochloride, M.P. 215–219° C. (uncorr.). A mixture of this product with 26 g. of dicyanodiamide and 860 ml. of dioxane was refluxed for six hours to yield 18 g. of 1-(4-n-hexylsulfonylphenyl)biguanide, which melted at 164–166° C. when recrystallized from ethyl alcohol.

(B) A mixture of 17 g. of 1-(4-n-hexylsulfonylphenyl)biguanide and 50 ml. of 98–100 percent formic acid was refluxed for three hours to produce 10 g. of solid which was recrystallized twice from 95 percent ethyl alcohol, with charcoaling each time, to yield approximately 6 g. of 2-amino-4-(4-n-hexylsulfonylphenylamino)-1,3,5-triazine, having the molecular formula $C_{15}H_{21}N_5S_2$, as off-white prisms which melted at 175–185°C.

The solubility of this base in water was less than 0.25 percent and 95 percent ethyl alcohol was less than 1 percent.

*Example 11*

A mixture of 41 g. of 1-(4-n-butylsulfonylphenyl)biguanide, M.P. 157–161° C. (uncorr.) (obtained by interaction of 4-n-butylsulfonylaniline hydrochloride with dicyanodiamide) and 164 ml. of 90 percent formic acid was refluxed for four hours to yield 21.5 g. of solid. When recrystallized from 95 percent ethyl alcohol and charcoaling this product, which was 2-amino-4-(4-n-butylsulfonylphenylamino)-1,3,5-triazine, having the molecular formula $C_{13}H_{17}N_5S_2$, weighed 17.5 g. and melted at 212–213° C.

*Example 12*

By refluxing a mixture of 20.2 g. of 1-(4-n-amylsulfonylphenyl)biguanide, and 60 ml of 98–100 percent formic acid for three hours there was obtained 10 g. of 2-amino-4-(4-n-amylsulfonylphenylamino)-1,3,5-triazine, having the molecular formula $C_{14}H_{19}N_5O_2S$, as a white powder which melted at 205–206° C.

*Example 13*

By refluxing a mixture of 45 g. of 1-[3,4-bis(n-propylmercapto)phenyl]biguanide hydrochloride, 9.2 g. of sodium formate, and 172 ml. of 90 percent formic acid for three hours there was obtained 9.1 g. of 2-amino-4-[3,4-bis(n-propylmercapto)phenylamino]-1,3,5-triazine, having the molecular formula $C_{15}H_{21}N_5S_2$, as a white powder which melted at 152–157° C.

*Example 14*

By refluxing a mixture of 100 g. of 1-[3,4-bis(ethylmercapto)phenyl]biguanide hydrochloride, 23.2 g. of sodium formate, and 430 ml. of 90 percent formic acid for three hours there was obtained 47.4 g. of 2-amino-4-[3,4-bis(ethylmercapto)phenylamino]-1,3,5-triazine, having the molecular formula $C_{13}H_{17}N_5S_2$, as an off-white powder which melted at 188–189° C.

*Example 15*

By refluxing a mixture of 54.6 g. of 1-(4-ethylsulfonylphenyl)biguanide and 220 ml. of 90 percent formic acid for three hours there was obtained 20.8 g. of 2-amino-4-(4-ethylsulfonylphenylamino)-1,3,5-triazine, having the molecular formula $C_{11}H_{13}N_5O_2S$, as a white powder which melted at 219–220° C.

*Example 16*

By refluxing a mixture of 45 g. of 1-(4-n-propylsulfonylphenyl)biguanide and 180 ml. of 90 percent formic acid for three hours there was obtained 14.7 g. of 2-amino-4-(4-n-propylsulfonylphenylamino)-1,3,5-triazine, having the molecular formula $C_{12}H_{15}N_5O_2S$, as a white powder which melted at 184–186° C.

*Example 17*

By refluxing a mixture of 38 g. of 1-(4-isopropylmercaptophenyl)biguanide and 375 ml. of 90 percent formic acid for three hours there was obtained 21 g. of 2-amino-4-(4-isopropylmercaptophenylamino)-1,3,5-triazine having the molecular formula $C_{12}H_{15}N_5S$, as a white solid which melted at 178–179° C.

*Example 18*

By refluxing a mixture of 51.3 g. of 1-(4-n-amylmercaptophenyl)biguanide and 453 ml. of 90 percent formic acid for three hours there was obtained 26.1 g. of 2-amino-4-(4-n-amylmercaptophenylamino)-1,3,5-triazine, having the molecular formula $C_{14}H_{19}N_5S$, as an off-white solid which melted at 167–168° C.

*Example 19*

By refluxing a mixture of 21.7 g. of 1-(4-n-hexylmercaptophenyl)biguanide and 183 ml. of 90 percent formic acid for three hours there was obtained 5.3 g. of 2-amino-4-(4-n-hexylmercaptophenylamino)-1,3,5-triazine, having the molecular formula $C_{15}H_{21}N_5S$, as a white solid which melted at 165–167° C.

*Example 20*

By refluxing a mixture of 36.5 g. of 1-(3-methylmercaptophenyl)biguanide hydrochloride and 360 ml. of 90 percent formic acid for three hours and treating the resulting reaction product with 35 percent aqueous sodium hydroxide solution there was obtained 15.9 g. of 2-amino-4-(3-methylmercaptophenylamino)-1,3,5-triazine having the molecular formula $C_{10}H_{11}N_5S$, as a white powder which melted at 178–179° C.

*Example 21*

By refluxing a mixture of 38 g. of 1-(3-n-propylmercaptophenyl)biguanide and 375 ml. of 90 percent formic acid for three hours there was obtained 16.1 g. of 2-amino-4-(3-n-propylmercaptophenylamino)-1,3,5-triazine, having the molecular formula $C_{12}H_{15}N_5S$, as a white solid which melted at 145–147° C.

*Example 22*

By refluxing a mixture of 29.3 g. of 1-(2-n-propylmercaptophenyl)biguanide (obtained as a brown oil) and 240 ml. of 90 percent formic acid there was obtained 7 g. of 2-amino-4-(2-n-propylmercaptophenylamino)-1,3,5-triazine, having the molecular formula $C_{12}H_{15}N_5S$, as a white solid which melted at 113–115° C.

*Example 23*

By refluxing a mixture of 73.6 g. of 1-(3,5-dichloro-4-methylmercaptophenyl)biguanide hydrochloride, 16 g. of sodium formate, and 295 ml. of 90 percent formic acid for three hours there was obtained 7.5 g. of 2-amino-4-(3,5-dichloro-4-methylmercaptophenylamino)-1,3,5-triazine, having the molecular formula $C_{10}H_9Cl_2N_5S$, as an off-white powder which melted at 208–210° C.

*Example 24*

By refluxing a mixture of 40 g. of 1-(3,5-dichloro-4-ethylmercaptophenyl)biguanide hydrochloride, 9.1 g. of sodium formate, and 160 ml. of 90 percent formic acid for three hours there was obtained 10.5 g. of 2-amino-4-(3,5-dichloro-4-ethylmercaptophenylamino)-1,3,5-triazine, having the molecular formula $C_{11}H_{11}Cl_2N_5S$, as a white powder which melted at 200–201° C.

*Example 25*

By refluxing a mixture of 47 g. of 1-(3,5-dichloro-4-n-propylmercaptophenyl)biguanide hydrochloride, 10.3 g. of sodium formate, and 188 ml. of 90 percent formic acid for three hours there was obtained 14 g. of 2-amino-4-(3,5-dichloro-4-n-propylmercaptophenylamino)-1,3,5-triazine, having the molecular formula $C_{12}H_{13}Cl_2N_5S$, as an off-white powder which melted at 190–192° C.

In addition to having diuretic activity, our new 2-amino-4-arylamino-1,3,5-triazines showed antiinflammatory activity in one or more of three different types of test procedure, viz., inhibition of granuloma pouch formation in rats, inhibition of dextran-induced local foot edema in rats, and inhibition of lung inflammation in mice. For example, the following results for eight species (Compounds I–VIII inclusive) in comparison with a reference compound (IX) were obtained in tests at the indicated dosage levels of the test compounds which measured the percentage inhibition of lung weight increase in mice infected with para-influenza virus, Sendai strain:

| Test Compound No. | Dose/Route (Mg./Kg./Day) | Percent Inhibition of Lung Weight Increase |
|---|---|---|
| I | 100/i.g. | 78 |
|   | 50/s.c. | 54 |
|   | 25/s.c. | 20 |
| II | 100/i.g. | 61 |
|   | 50/s.c. | 26 |
|   | 25/s.c. | 29 |
| III | 100/i.g. | 47 |
|   | 100/s.c. | 83 |
|   | 50/s.c. | 40 |
|   | 25/s.c. | 42 |
| IV | 200/i.g. | 46 |
|   | 100/s.c. | 35 |
|   | 50/s.c. | 19 |
|   | 25/s.c. | 4 |
| V | 100/i.g. | 35 |
|   | 100/s.c. | 64 |
|   | 50/s.c. | 39 |
|   | 25/s.c. | 17 |
| VI | 200/i.g. | 59 |
|   | 200/s.c. | 55 |
|   | 100/s.c. | 31 |
| VII | 200/i.g. | 23 |
|   | 100/i.g. | 0 |
|   | 200/s.c. | 43 |
|   | 100/s.c. | 22 |
|   | 100/i.g. | 40 |
| VIII | 50/i.g. | 35 |
|   | 100/s.c. | 47 |
|   | 50/s.c. | 47 |
| IX | 100/i.g. | 15 |
|   | 100/s.c. | 5 |
|   | 50/s.c. | 25 |

The test compounds in the above table are identified as follows:

I—2-amino-4-(4-methylmercaptophenylamino)-1,3,5-triazine (Example 1A)

II—2-amino-4-(4-ethylmercaptophenylamino)-1,3,5-triazine (Example 2A)

III—2-amino-4-(4-n-propylmercaptophenylamino)-1,3,5-triazine (Example 3)

IV—2-amino-4-(4-isopropylmercaptophenylamino)-1,3,5-triazine (Example 17)

V—2-amino-4-(n-butylmercaptophenylamino)-1,3,5-triazine (Example 4)

VI—2-amino-4-(3-chloro-4-n-butylmercaptophenylamino)-1,3,5-triazine (Example 6)

VII—2-amino-4-(4-n-amylmercaptophenylamino)-1,3,5-triazine (Example 18)

VIII—2-amino-4-(4-n-hexylmercaptophenylamino)-1,3,5-triazine (Example 19)

IX—Reference compound: 2-amino-4-(4-methoxyphenylamino)-1,3,5-triazine.

We claim:

1. A 2-amino-4-arylamino-6-(H—)-1,3,5-triazine of the formula

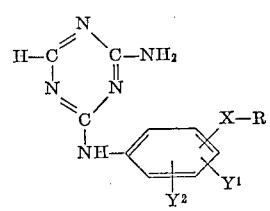

wherein: $Y^1$ is a member of the group consisting of hydrogen, halogen, and R—X—; $Y^2$ is a member of the group consisting of hydrogen and halogen; R is lower alkyl; and X is a member of the group consisting of —S—, —SO—, and —SO$_2$—.

2. 2-(H$_2$N—)-4-(lower alkylmercaptophenyl-NH—)-6-(H—)-1,3,5-triazine.

3. 2-(H$_2$N—)-4-(lower alkylsulfinylphenyl-NH—) - 6-(H—)-1,3,5-triazine.

4. 2-(H$_2$N—)-4-(lower alkylsulfonylphenyl-NH—) - 6-(H—)-1,3,5-triazine.

5. 2-(H$_2$N—)-4 - (lower alkylmercapto - halophenyl-NH—)-6-(H—)-1,3,5-triazine.

6. 2-(H$_2$N—) - 4 - (lower alkylsulfonyl - halophenyl-NH—)-6-(H—)-1,3,5-triazine.

7. 2-(H$_2$N—) - 4 - [bis(lower alkylmercapto)phenyl-amino]-6-(H—)-1,3,5-triazine.

8. 2-(H$_2$N—)-4-(3-chloro - 4 - lower alkylmercapto-phenylamino)-6-(H—)-1,3,5-triazine.

9. 2-amino-4-(4-methylmercaptophenylamino) - 1,3,5-triazine.

10. 2-amino-4-(4-ethylmercaptophenylamino) - 1,3,5-triazine.

11. 2-amino-4-(4-n-propylmercaptophenylamino) - 1,3,5-triazine.

12. 2-amino-4-(4-n-butylmercaptophenylamino) - 1,3,5-triazine.

13. 2-amino-4-(4-methylsulfonylphenylamino) - 1,3,5-triazine.

14. 2-amino-4-(3-chloro-4 - n - propylmercaptophenyl-amino)-1,3,5-triazine.

References Cited by the Examiner
UNITED STATES PATENTS
2,836,539  5/58  Cutler _____ 260—249.9
3,097,205  7/63  Cutler _____ 260—249.5

FOREIGN PATENTS
1,024,516  2/58  Germany.

OTHER REFERENCES
Clauder et al.: "Magyar Kem. Folyoirot," vol. 57, pp. 68–73 (1951).

Lowy et al.: "An Introduction to Organic Chemistry," 6th edition, pub. by Wiley and Sons, Inc., N.Y. (1945), p. 213.

WALTER A. MODANCE, *Primary Examiner.*

NICHOLAS S. RIZZO, *Examiner.*